INVENTOR.
ROMEO M. NARDONE
BY Martin J. Finnegan
ATTORNEY

Dec. 9, 1952 R. M. NARDONE 2,620,975
AVERAGE SPEED INDICATOR
Filed July 27, 1950 5 Sheets-Sheet 3

INVENTOR
ROMEO M. NARDONE
BY
Martin J. Finnegan
ATTORNEY

Dec. 9, 1952
R. M. NARDONE
2,620,975
AVERAGE SPEED INDICATOR
Filed July 27, 1950
5 Sheets-Sheet 4
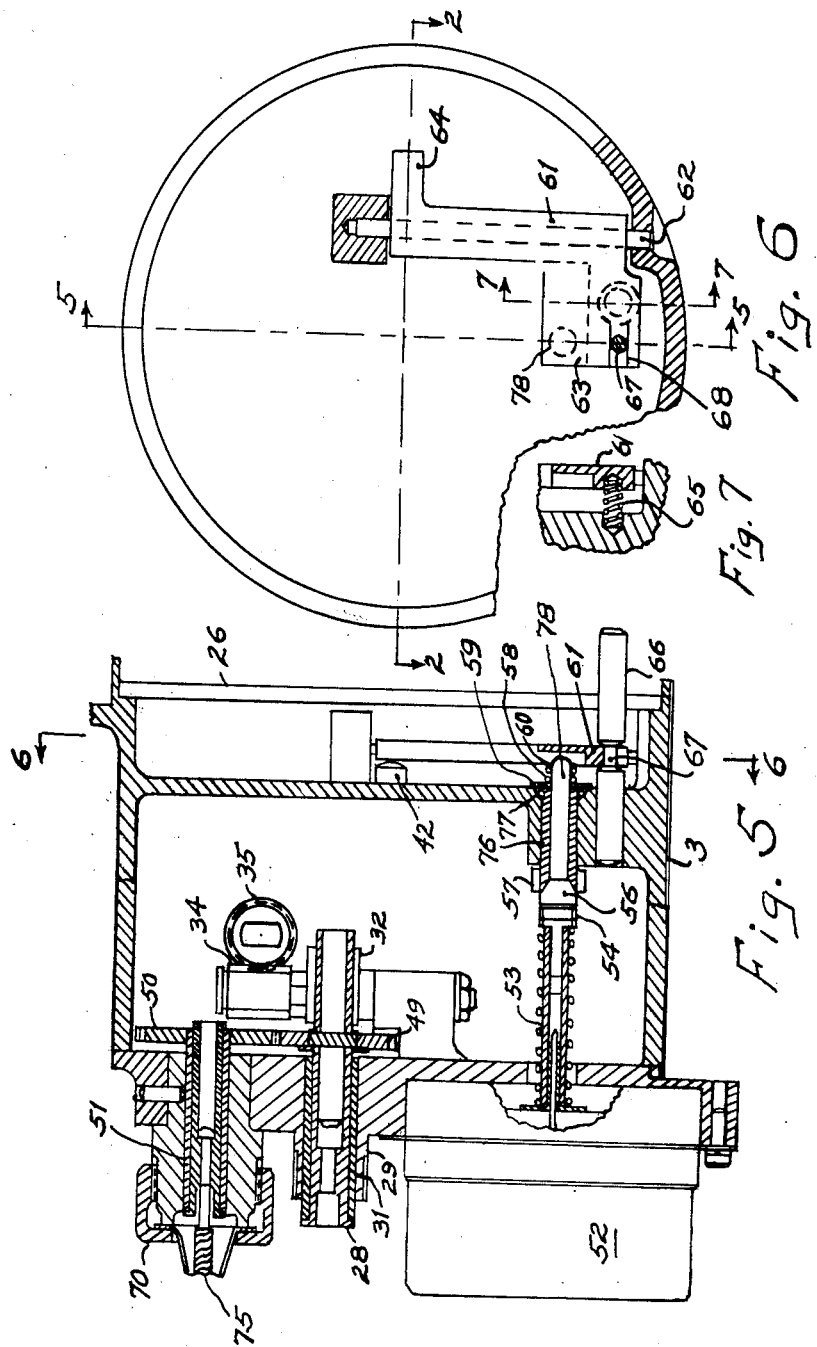
INVENTOR
ROMEO M. NARDONE
BY
Martin J. Finnegan
ATTORNEY Dec. 9, 1952          R. M. NARDONE          2,620,975

AVERAGE SPEED INDICATOR

Filed July 27, 1950                                   5 Sheets-Sheet 5

INVENTOR.
ROMEO M. NARDONE
BY
Martin J. Finnegan
ATTORNEY

Patented Dec. 9, 1952

2,620,975

UNITED STATES PATENT OFFICE 2,620,975

AVERAGE SPEED INDICATOR

Romeo M. Nardone, Teaneck, N. J.

Application July 27, 1950, Serial No. 176,167

2 Claims. (Cl. 235—61)

This invention relates to indicating mechanism, and particularly to a mechanism for computing and indicating the average speed at which a vehicle has been traveling over a selected period of time.

When one or more persons are en route to a destination a considerable number of miles removed from the starting point of the vehicle in which they are traveling, such person or persons usually are interested to know whether they are traversing the distance at a sufficient rate of speed to assure their arrival at their destination at the selected hour. The conventional type of speedometer will indicate only the speed of the vehicle at a given instant; and as such instantaneous speed varies sharply from minute to minute, such a speedometer is of little or no assistance in attempting to compute the exact average rate of speed of the vehicle over the entire course of the journey. Likewise, the conventional type of mileage recorder is of very little assistance, for it merely records the total number of miles traveled, not the speed averaged by the vehicle in traveling the recorded distance.

The present invention provides a method of indicating, by means of a pointer and dial, or any equivalent instrument, the speed averaged by a vehicle from a starting point; the indication being constantly visible to the occupants of the vehicle throughout the entire period of the journey, and the indicating pointer, or equivalent index element, being shiftable only when there is a change in average speed and therefore being adapted to remain substantially steady in its indication through momentary periods of speed fluctuation that do not materially affect the over-all average speed of the vehicle.

In the embodiment of the invention illustrated in the accompanying drawings, an indicating pointer is caused to rotate across a dial in response to the tilting of a lever about a slidable support; there being motion transmitting connections from the said lever to the pointer, and the lever being caused to tilt by the shifting of the said slidable support, which support is constrained to shift its position along an oblique path having two components forming a right angle, on each of which component paths there is provided a support-shifting element, one of which elements is advanced along its ordinal path in synchronism with the rotation of the vehicle's mileage recording mechanism, and the other being advanced along its abscissal path in synchronism with a clock, or constant-speed motor whose action corresponds to that of a clock.

In the drawings:

Fig. 5 is a longitudinal sectional view along a vertical plane;

Fig. 6 is a transverse vertical view along line 6—6 of Fig. 5;

Fig. 7 is a transverse view along line 7—7 of Fig. 6;

The principle utilized in the concept of the invention is the following: In any right-angled triangle the tangent of the angle opposite the vertical side "$y$" is equal to the quotient of "$y$" divided by "$x$," the latter being the designation for the horizontal side of the triangle. For any given angle, both $y$ and $x$ may vary at will—both increasing or decreasing proportionately. By causing the "$y$" element of my mechanism to move vertically in proportion to the number of miles a vehicle travels, while the "$x$" element moves horizontally in proportion to the number of hours elapsing as the vehicle proceeds toward its destination, and by causing such motions to be imparted in combined fashion to the lever-tilting support to cause it to shift obliquely and thus tilt the lever, proportionately to the varying quotient of $y/x$, I obtain from such tilting of the lever a visual reading showing the exact quotient of total miles traveled divided by total hours elapsed. This quotient is readable directly from the scale by noting the position to which the pointer has been rotated by said tilting lever, through the interposed crank and gear train.

Figure 1:
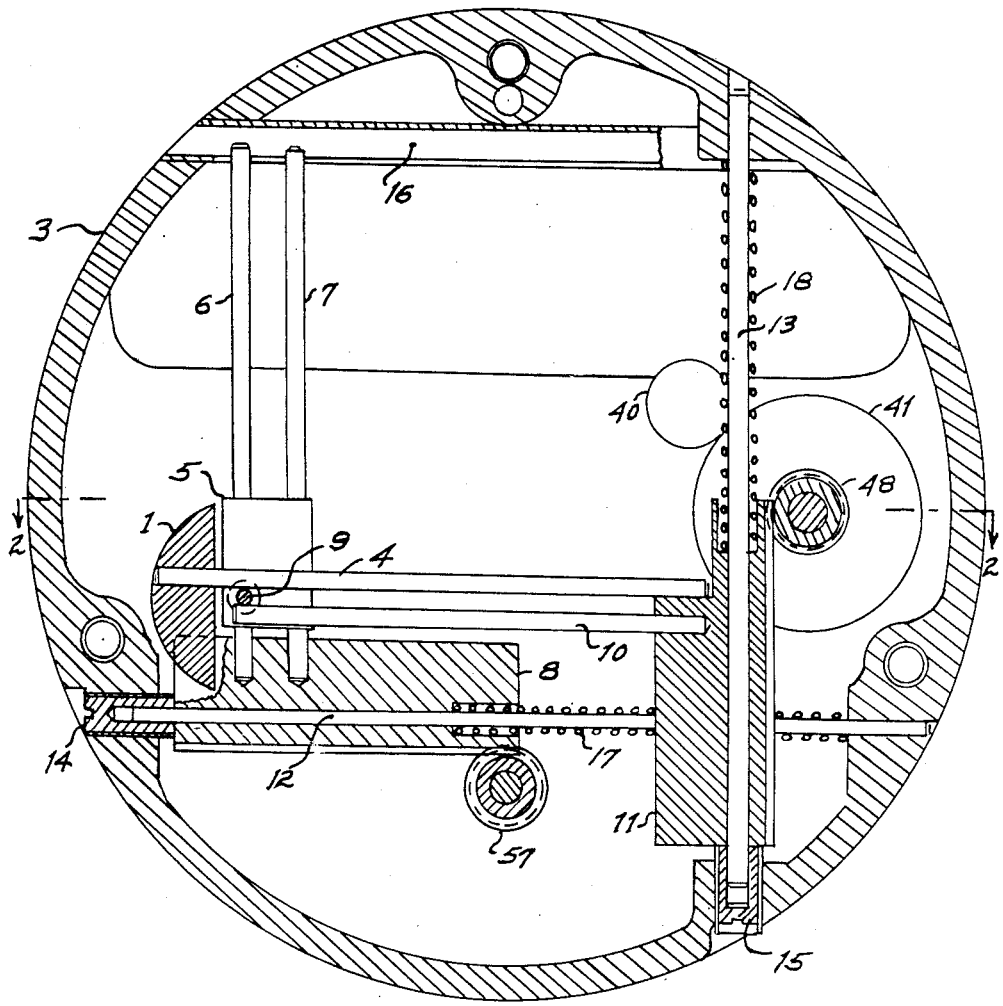
Fig. 1 is a sectional view of a mechanism embodying the invention, in transverse vertical section.
Figure 2:
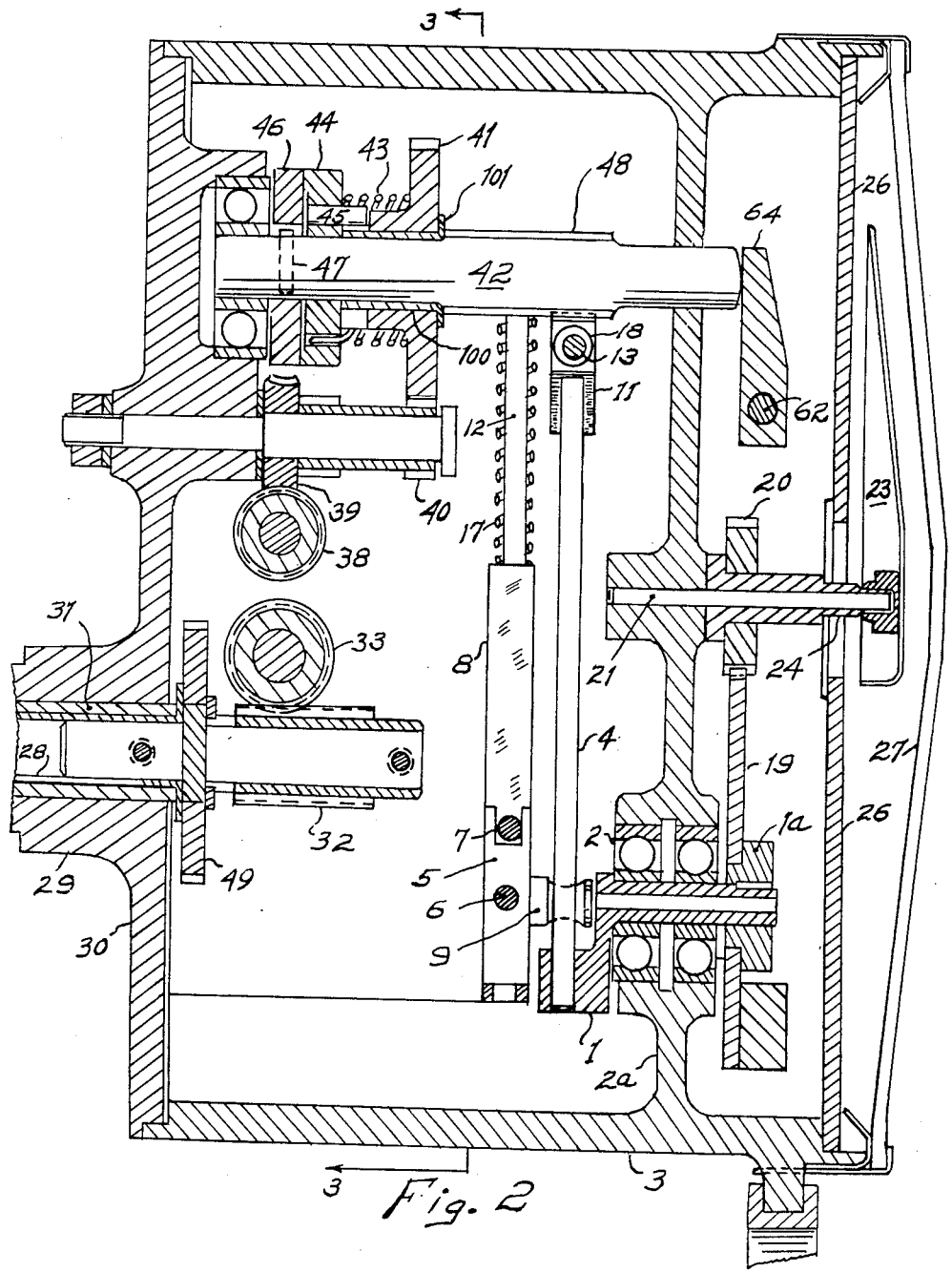
Fig. 2 is a horizontal sectional view.

Referring first to Figs. 1 and 2, the said crank is shown at 1, the gear train at 19 and 20, the pointer at 23, the dial-scale at 26, the "$x$" element at 8, the "$y$" element at 11, the tilting lever at 4, and the obliquely shiftable lever support at 5; the latter having a concavely cylindrical pin 9 extending therefrom to do the actual supporting and tilting of the lever 4, while the left-hand end of said lever is anchored in the body of the crank, as clearly shown in Fig. 1.

Also as shown in Figs. 1 and 2, crank 1 has a counter-weighted lateral extension that is in the shape of an arcuate segment of a circle, when viewed in cross-section as in Fig. 1. The crank arm is integral with and forms part of a crank-shaft whose central portion is rotatably received in ball-bearing assemblies 2 carried by the transverse wall 2a of the housing 3. The said lateral extension of crank 1 has a drilled hole to receive and firmly hold one end of lever 4, whereby tilting of said lever about its fulcrum pin 9 causes corresponding tilting of the weighted crank 1, and a resultant rotation of gears 19, 20 and pointer 23; the gear 19 having a firm fit on the shank or hub of the outer portion 1a of the crank-shaft. (See Fig. 2.) Lever support 5, which carries the fulcrum pin 9, is of rectangularly prismatic shape, and is vertically bored at two points to receive vertically disposed rails 6 and 7 anchored at their bases in the "x" element 8, and therefore shiftable laterally, to produce a corresponding shift of slide-block 5, as the element 8 moves in its horizontal path in response to rotation of its driving pinion 57. A slotted tube 16, extending across the housing 3 and anchored therein, receives the upper ends of rails 6 and 7 and thus holds them in a common vertical plane as they shift laterally with element 8 and slide-block 5; but as slide-block 5 shifts laterally, it also "climbs" on rails 6 and 7 due to the upward lift imparted thereto by a lifting rod 10 engaging the under side of fulcrum pin 9 and extending horizontally across the instrument for anchorage in the "y" element 11 and for vertical ascent in unison therewith; the said "y" element 11 having rack teeth similar to those on element 8, and actuated by a pinion 48 engageable therewith. A horizontal rail 12 guides the element 8 as it moves horizontally, and a similar vertical rail 13 guides the vertical travel of element 11. Springs 17 and 18 surround the respective rails and serve as means for returning the respective "x" and "y" elements to their initial positions at the conclusion of the journey. The initial center position of fulcrum pin 9 is adjusted by turning screws 14 and 15 against their respective elements 8 and 11, thus accurately locating the slide-bloc 5 and hence the pin 9, integral therewith.

Pinion 20 is guided on a post 21 pressed in housing 3. Pointer 23 is secured to shaft extension 24 of pinion 20. Dial 26 is pressed and held against a circular shoulder on housing 3. A glass or transparent plastic face 27 is secured to the housing as a covering for the dial and pointer.

Figure 4:
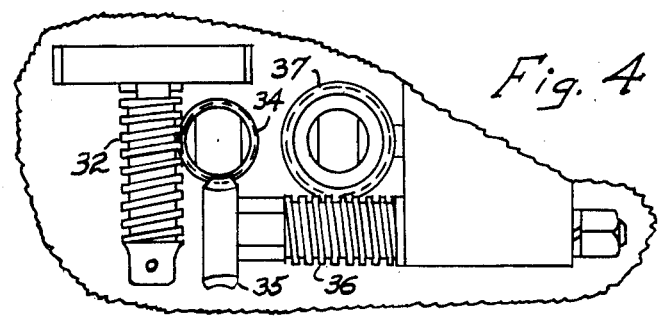
Fig. 4 is a top view of the parts most prominently shown in Fig. 3.
Figure 3:
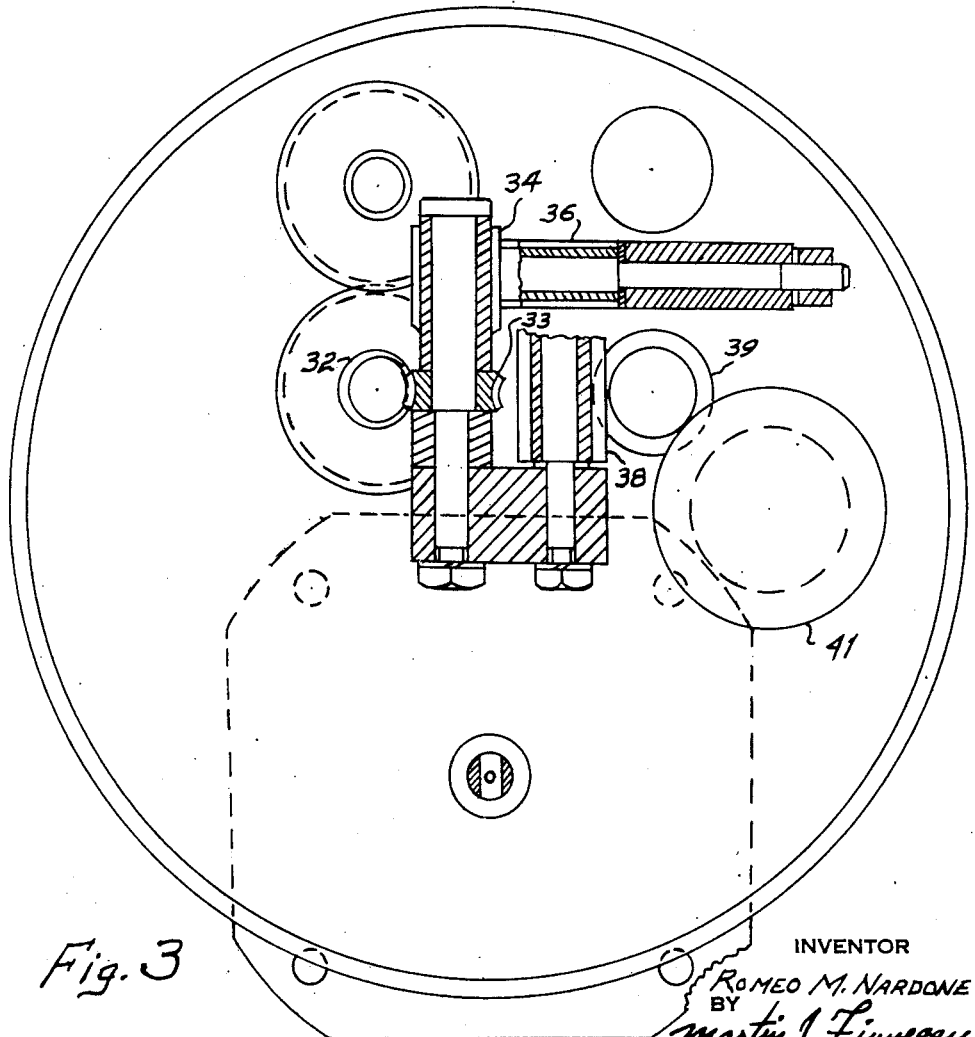
Fig. 3 is a vertical sectional view along line 3—3 of Fig. 2.
Figure 9:
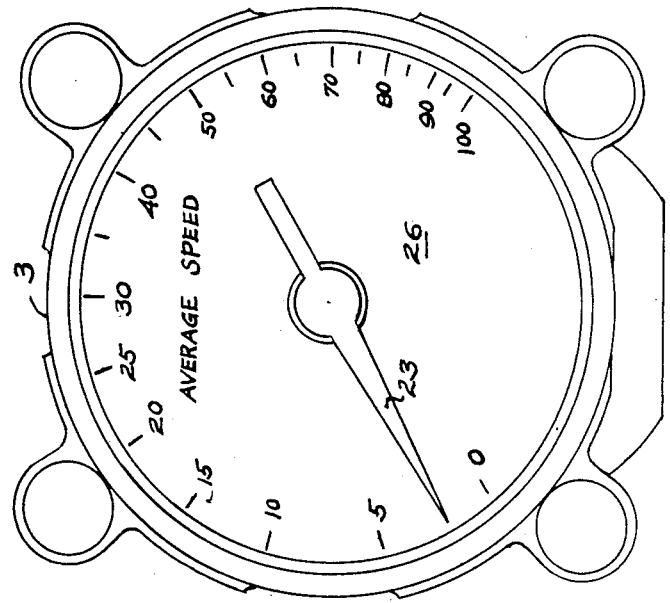
Figs. 8 and 9 are rear and front views, respectively.

The flexible speedometer shaft (not shown) from the vehicle transmission is attached to drive shaft 28 while the shaft casing (not shown) is secured to boss 29 of rear cover 30. Shaft 28 rotates in a suitable bushing 31 and has secured to it worm pinion 32. The reduction gearing is also shown in Figs. 3, 4, and 5. Worm 32 drives worm gear 33, integrated (see Fig. 3) with a second worm 34 driving worm gear 35. Worm gear 35 is integrated with worm 36, meshing with worm gear 37. Gear 37 is integrated with worm 38 driving worm gear 39. As shown best in Fig. 2, gear 39 is integrated with the shank of spur pinion 40, the latter driving gear 41 mounted on rack-operating shaft 42. A torsion spring 43 is interposed between gear 41 and a driving clutch plate 44. The latter is provided with a pin 45 engaging a slot in the face of the hub gear 41 so that the torsion spring is initially under tension. Driving clutch plate 44 is free on shaft 42, but driven clutch plate 46 is keyed or pinned to the shaft 42, as indicated at 47, to impart rotation to said shaft 42 and thereby actuate rack 11.

As indicated best in Fig. 5, the take-off for the speedometer drive is through gears 49 and 50. The latter is secured to shaft 51 which in turn drives flexible shaft 75 leading to the speedometer (not shown).

The timing device 52 is a constant-speed electric motor or clock powered by a low-voltage automobile battery. Its output shaft 53 rotates one revolution in 12 hours. An Oldham coupling 54 is connected between shaft 53 and cone clutch 56 driving the rack-operating pinion 57. The latter has a long shank or hub portion 76 (Fig. 5) rotatably mounted in housing 3, but held against axial shift by a lock ring 77 secured to said shank 76 and bearing laterally against a counter-sunk seat in the housing wall. A second lock ring 60 on the clutch extension 78 retains spring 58 thereon; the spring thus serving to bias the cone clutch 56 into driving position. A washer 59 is placed between the spring 58 and the housing wall, to serve as the spring abutment, or seat.

Bell crank member 61 is pivoted on pin 62 of housing 3. Two arms extend from the pivoted center portion. Extension 63 reduced in thickness is opposite the end of clutch extension 78. Extension 64 is opposite the end of shaft 42 and and pressing against it due to force of spring 65 which acts on the lower portion of extension 63. Spring 65 is in a bore of housing 3 and supplies the pressure between 44 and 46 to drive pinion 48 and rack 11. Bushing 100 and washer 101 transmit the force to the clutch plates.

Push rod 66 extending through the dial and glass face of the instrument is guided in housing 3. A necked portion 67 engages slot 68 of extension 63. By pressing in on 66 the right hand shoulder at the necked portion 67 contacts the face of 63 and pivots the bell crank 61 about its pivot point. As it pivots, the pressure of 44 and 46 is relieved and no drive is transmitted to the rack. Spring 18 may then return rack 11 to its initial or zero position. Further motion of 63 moves 56 to the left and disengages its coned portion from pinion 57 such that spring 17 returns rack 8 to neutral.

Clock or timer 52 is wired across the ignition switch so that time is recorded only when the engine is running or the car operating. If desired, the timer may be connected at all times to obtain average speed including stops for meals, etc. In that case when the timer has moved its rack the full distance and cannot move further, the cone clutch will slip. If desired, a limit switch may be included at the end of the rack stroke to cut out or stop the clock.

In operation, when the driver wishes to record average speed on his trip he pushes on button 66 to insure that both racks are at neutral position and slider extension 9 at zero point. Upon releasing the button cone clutch 56 will engage pinion 57. The resultant rotation of pinion 57 causes motion of rack 8 to the right. At the same time clutch (44—46) is engaged for the speedometer shaft to drive the miles rack 11. During the first minute or so rack 11 cannot move up since slider 9 is on the center of the crankshaft 1. Spring 43 begins to wind up to record the miles traveled during that time. As soon as the timer has moved the slider off-center a few thousandths of an inch, the push-up on rod 10 resulting from the wind-up of spring 43 imposes sufficient torque to rotate the crank and to indicate average speed from there on.

Figure 8:
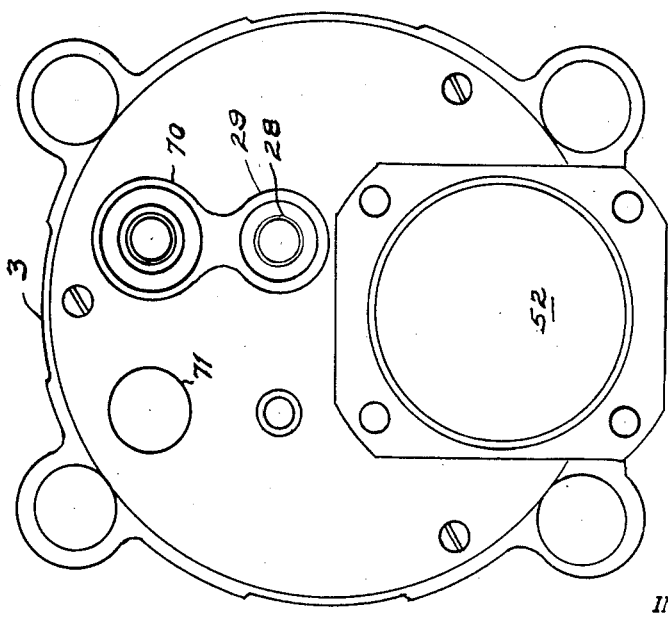

If button 66 is not pressed during the total number of miles required to move rack 11 its full travel, the rack will come to a stop at the end of such full travel, and the clutch at (44—46) will slip. The dial 26 may be illuminated by a light insertable in socket 71 (Fig. 8).

Figure 10:
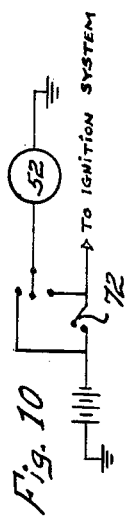
Fig. 10 is a diagram of electrical connections.

Fig. 10 illustrates one manner of connecting the clock or timing motor 52 for operation in either series or parallel relation to the ignition key-switch 72, depending upon whether it is desired to include or exclude stop-over time in the average-speed computation.

In preparing Figs. 1 and 2 of the drawings it has been assumed, for the purpose of maintaining clarity of illustration, that lifting rod 10 is directly under (that is, in the same vertical plane as) lever 4. Actually, it is offset from the vertical plane of lever 4 by an amount sufficient to prevent interference between these two elements as they travel through their respective cycles; the lever 4 having a tilting orbit while the rod 10 moves straight upward, with "y" element 11.

What I claim is:

1. Means for indicating the speed averaged by a vehicle in traveling from a starting point, said means comprising a shiftable support, a stationary horizontal rail, a stationary vertical rail, a lever tiltable by said shiftable support, and means including a motion-responsive vertically moving actuator riding on said vertical rail and a co-operating time-responsive horizontally moving actuator riding on said horizontal rail for exerting shifting influences upon said shiftable support as said actuators advance in two different directions in right-angular relation to each other, to tilt said lever obliquely to both said directions, an index element operated by said lever, and means under manual control for initially setting said actuators in their respective positions of neutrality with respect to said lever support, which positions correspond to the zero position of said index element, said setting means including separate adjusting screws abutting said vertically and horizontally moving actuators at their respective outer ends, and opposing springs abutting said actuators at their respective inner ends, said springs being coiled about said vertical and horizontal rails, respectively.

2. In an indicating mechanism, a pair of stationary guide rails, one having its longitudinal axis disposed horizontally, the other having its longitudinal axis disposed vertically, a distance-responsive carriage movable along said vertically disposed guide rail, a time-responsive carriage movable along said horizontally disposed guide rail, means for moving said carriages, said means including separate drives for each of said carriages, said drives including releasable clutch elements, and resilient means coiled about said guide rails for returning said carriages to their respective zero positions in response to release of said clutch elements.

ROMEO M. NARDONE.

REFERENCES CITED

The following references are of record in the file of this patent:

UNITED STATES PATENTS

| Number | Name | Date |
| --- | --- | --- |
| 1,282,553 | Eaton | Oct. 22, 1918 |
| 1,343,198 | Eaton | June 15, 1920 |
| 1,450,410 | Cox | Apr. 3, 1923 |
| 1,889,876 | Pellerin et al. | Dec. 6, 1932 |
| 1,895,347 | Salomon et al. | Jan. 24, 1933 |

FOREIGN PATENTS

| Number | Country | Date |
| --- | --- | --- |
| 608,212 | France | July 23, 1926 |
| 634,272 | France | Feb. 13, 1928 |
| 717,529 | France | Jan. 9, 1932 |